(12) United States Patent
Yokota

(10) Patent No.: US 12,226,915 B2
(45) Date of Patent: Feb. 18, 2025

(54) BELT CONVEYOR CALIBRATION METHOD, ROBOT CONTROL METHOD, AND ROBOT SYSTEM

(71) Applicant: Seiko Epson Corporation, Tokyo (JP)

(72) Inventor: Masato Yokota, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 466 days.

(21) Appl. No.: 17/494,916

(22) Filed: Oct. 6, 2021

(65) Prior Publication Data

US 2022/0105641 A1    Apr. 7, 2022

(30) Foreign Application Priority Data

Oct. 7, 2020 (JP) ................. 2020-169797

(51) Int. Cl.

| | |
|---|---|
| *B25J 9/16* | (2006.01) |
| *B25J 9/00* | (2006.01) |
| *B25J 13/08* | (2006.01) |
| *G06T 1/00* | (2006.01) |
| *G06T 7/00* | (2017.01) |
| *G06T 7/20* | (2017.01) |
| *G06T 7/70* | (2017.01) |

(Continued)

(52) U.S. Cl.
CPC .......... *B25J 9/1692* (2013.01); *B25J 9/0093* (2013.01); *B25J 13/08* (2013.01); *G06T 1/0014* (2013.01); *G06T 7/001* (2013.01); *G06T 7/20* (2013.01); *G06T 7/70* (2017.01); *H04N 23/695* (2023.01); *H04N 23/90* (2023.01); *G06T 2207/30164* (2013.01); *G06T 2207/30204* (2013.01)

(58) Field of Classification Search
CPC ...... B25J 9/1692; B25J 9/0093; B25J 9/1697; G06T 7/20; G06T 7/80; H04N 23/90
See application file for complete search history.

(56) References Cited

U.S. PATENT DOCUMENTS

| | | | | |
|---|---|---|---|---|
| 2007/0073439 A1* | 3/2007 | Habibi | ............... | G05B 19/4182 700/213 |
| 2012/0229620 A1* | 9/2012 | Ikeda | ..................... | B25J 9/1692 348/94 |

(Continued)

FOREIGN PATENT DOCUMENTS

| | | |
|---|---|---|
| JP | 2004-001122 A | 1/2004 |
| JP | 2011-157197 A | 8/2011 |

(Continued)

*Primary Examiner* — Jonathan L Sample
*Assistant Examiner* — Mohammed Yousef Abuelhawa
(74) *Attorney, Agent, or Firm* — Harness, Dickey & Pierce, P.L.C.

(57) ABSTRACT

A belt conveyor calibration method includes transporting a marker by a belt of a belt conveyor, imaging the marker by a first camera, detecting the marker passing through one section of a plurality of sections formed by division of a first imaging area of the first camera from a captured image of the first camera, moving a second camera by a robot and tracking and imaging the detected marker by the second camera, and calculating and storing a correction value as a difference between a position of the marker estimated from a transportation amount of the belt and a position of the marker detected from an image of the marker tracked and imaged.

4 Claims, 10 Drawing Sheets

(51) Int. Cl.
*H04N 23/695* (2023.01)
*H04N 23/90* (2023.01)

(56) References Cited

U.S. PATENT DOCUMENTS

| | | | | |
|---|---|---|---|---|
| 2014/0288710 | A1* | 9/2014 | Ikenaga | B25J 9/1692 |
| | | | | 901/47 |
| 2016/0151916 | A1* | 6/2016 | Kanno | B25J 9/1697 |
| | | | | 700/228 |
| 2018/0272537 | A1* | 9/2018 | Ishigaki | G06T 7/73 |
| 2019/0015973 | A1* | 1/2019 | Ooba | B25J 9/0093 |
| 2019/0112134 | A1* | 4/2019 | Ooba | B65G 43/08 |
| 2019/0256300 | A1* | 8/2019 | Shimamura | B25J 9/0093 |

FOREIGN PATENT DOCUMENTS

| | | |
|---|---|---|
| JP | 2015-174171 A | 10/2015 |
| JP | 2019-141935 A | 8/2019 |

* cited by examiner

BELT CONVEYOR CALIBRATION METHOD, ROBOT CONTROL METHOD, AND ROBOT SYSTEM

The present application is based on, and claims priority from JP Application Serial Number 2020-169797, filed Oct. 7, 2020, the disclosure of which is hereby incorporated by reference herein in its entirety.

BACKGROUND

1. Technical Field

The present disclosure relates to a belt conveyor calibration method, a robot control method, and a robot system.

2. Related Art

A robot system performing work using a robot on an object transported by a belt conveyor is known. In the belt conveyor, a belt changes over time and sags. The object transported by the sagging belt moves while meandering. To control the robot in consideration of the meandering due to sagging of the belt or the like, JP-A-2015-174171 discloses a method of correcting the meandering of the object due to sagging of the belt or the like. According to JP-A-2015-174171, a mark is placed on the belt and the belt intermittently moves. When the mark stops, a worker brings the distal end of a robot hand into contact with the mark and stores coordinates of the mark. That is, the position of the mark is measured. The movement of the belt, the stopping of the belt, and the measurement of the position of the mark are repeated, and thereby, meandering of the mark due to sagging of the belt or the like is measured.

However, according to the method of JP-A-2015-174171, the number of times of measurement of the position of the mark is larger when the work area is larger and measurement efficiency is not good. Specifically, in the method, the worker operates a teach pendant to move the distal end of the robot hand to the position of the mark. Accordingly, it takes time to measure the position of the mark. Therefore, a method of efficiently measuring the meandering of the mark due to sagging of the belt or the like is required.

SUMMARY

A belt conveyor calibration method includes transporting a marker by a belt of a belt conveyor, imaging the marker by a first camera, detecting the marker passing through one section of a plurality of sections formed by division of an imaging area of the first camera from a captured image of the first camera, moving a second camera by a robot and tracking and imaging the detected marker by the second camera, and calculating and storing a correction value as a difference between a position of the marker estimated from a transportation amount of the belt and a position of the marker detected from an image of the marker tracked and imaged.

A robot control method includes calculating and storing the correction value in a memory unit using the above described belt conveyor calibration method, when the robot performs work on an object on the belt, imaging the object by the first camera, detecting a section through which the object passes of the plurality of sections, acquiring the correction value corresponding to the section through which the object passes from the memory unit, and correcting position information of the object using the correction value and performing work on the object using the corrected position information of the object by the robot.

A robot system includes a belt conveyor having a belt for transportation and transporting a marker and an object, a robot having a motion range containing the belt, a first camera imaging the marker and the object on the belt, a second camera attached to an arm or a hand of the robot and tracking and imaging the marker on the belt, and a control section controlling motion of the robot and having a memory unit, wherein the control section detects the marker passing through one section of a plurality of sections formed by division of an imaging area of the first camera, calculates and stores in the memory unit a correction value as a difference between a position of the marker estimated from a transportation amount of the belt and a position of the marker detected from an image of the marker tracked and imaged in the memory unit, when the robot performs work on the object on the belt, controls the first camera to image the object, detects the section through which the object passes of the plurality of sections, acquires the correction value corresponding to the object passing through the section containing the object from the memory unit, and corrects position information of the object using the correction value and controls the robot to perform work on the object using the corrected position information of the object.

A non-transitory computer-readable storage medium stores a program causing a computer provided in a control section of a robot of a robot system including a belt conveyor in which a belt transports a marker and an object, the robot having a motion range containing the belt, a first camera imaging the marker and the object on the belt, a second camera moved by the robot and tracking and imaging the marker on the belt, and the control section controlling motion of the robot and having a memory unit to function as a first detection unit that detects the marker passing through one section of a plurality of sections formed by division of an imaging area of the first camera, a correction value calculation unit that calculates and stores in the memory unit a correction value as a difference between a position of the marker estimated from a transportation amount of the belt and a position of the marker detected from an image of the marker tracked and imaged, a second detection unit, when the robot performs work on the object on the belt, that inputs an image containing the object imaged by the first camera and detects the section through which the object passes of the plurality of sections, a correction unit that acquires the correction value corresponding to the object passing through the detected section from the memory unit and corrects position information of the object using the correction value, and a motion control unit that controls the robot to perform work on the object using the corrected position information of the object.

DESCRIPTION OF EXEMPLARY EMBODIMENTS

First Embodiment

In this embodiment, characteristic examples of a robot system, a calibration method for a belt conveyor, and a robot control method will be explained.

Figure 1:
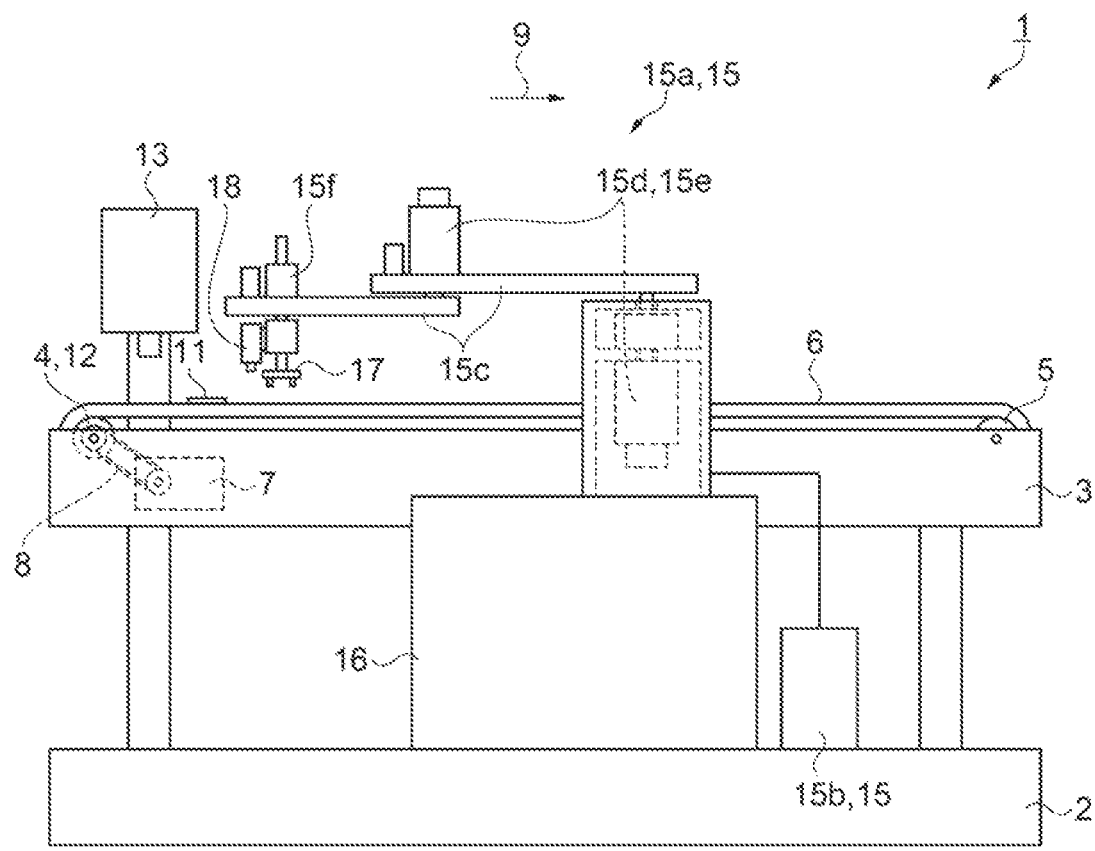
FIG. 1 is a schematic side view showing a configuration of a robot system according to a first embodiment.

As shown in FIG. 1, a robot system 1 includes a belt conveyor 3 on a base 2. The belt conveyor 3 includes a first pulley 4 and a second pulley 5. A belt 6 is looped around the first pulley 4 and the second pulley 5. The belt conveyor 3 includes a first motor 7. Torque of the first motor 7 is transmitted to the first pulley 4 by a transmission mechanism including a timing belt 8 and the like. When the shaft of the first motor 7 rotates, the first pulley 4 rotates and the belt 6 for transportation moves.

A direction from the first pulley 4 toward the second pulley 5 is referred to as "X positive direction". Width directions of the belt conveyor 3 are referred to as "Y directions". A direction from the base 2 toward the belt conveyor 3 is referred to as "Z positive direction". The X directions, the Y directions, and the Z directions are orthogonal to one another.

When the belt conveyor 3 is placed on the base 2, the belt 6 is adjusted not to meander. A direction in which the belt 6 moves is referred to as "first direction 9". With respect to the belt 6, the first pulley 4 side is upstream and the second pulley 5 side is downstream. The first direction 9 is the X positive direction. A plate 11 is placed on the belt 6. The plate 11 is transported by the belt conveyor 3 with the moving belt 6. When a workpiece is placed on the belt 6, the workpiece is transported by the belt conveyor 3 with the moving belt 6. The movement direction of the belt 6 may meander due to changes over time. When the belt 6 meanders, the movement direction of the belt 6 differs from the first direction 9.

A first encoder 12 is placed in the first pulley 4. The first encoder 12 is a rotary encoder and detects a rotation angle of the first pulley 4. The rotation angle of the first pulley 4 is directly proportional to a movement amount of the belt 6. Therefore, a movement amount of the plate 11 moving in the first direction 9 is detected from output of the first encoder 12.

A first camera 13 is placed in the Z positive direction of the belt 6 at the downstream of the first pulley 4. The first camera 13 images the upstream of the belt 6.

The plate 11 is placed in an imaging range of the first camera 13. Therefore, after the plate 11 is placed on the belt 6, the plate 11 is imaged by the first camera 13.

A robot 15 is placed between the first camera 13 and the second pulley 5. The robot 15 includes a robot main body 15a and a control apparatus 15b as a control section. The robot main body 15a is placed on a placement platform 16 placed on the base 2. The robot main body 15a includes a plurality of coupled arms 15c. The arm 15c includes an actuator 17 as a hand at the distal end.

The robot main body 15a includes pluralities of second motors 15d and second encoders 15e that rotate the respective arms 15c. The control apparatus 15b controls the position of the actuator 17 by driving the second motors 15d and the second encoders 15e.

The arm 15c includes an elevation device 15f at the distal end. The elevation device 15f moves the actuator 17 upward and downward. The control apparatus 15b controls the position of the actuator 17 in the Z directions by driving the elevation device 15f.

The actuator 17 is e.g. a hand gripping the plate 11, a motor driver, or the like. The control apparatus 15b controls driving of the actuator 17.

A second camera 18 is attached to the arm 15c of the robot 15 or the actuator 17. The second camera 18 images the plate 11 moving in the first direction 9. The motion range of the robot 15 contains the belt 6.

Figure 2:
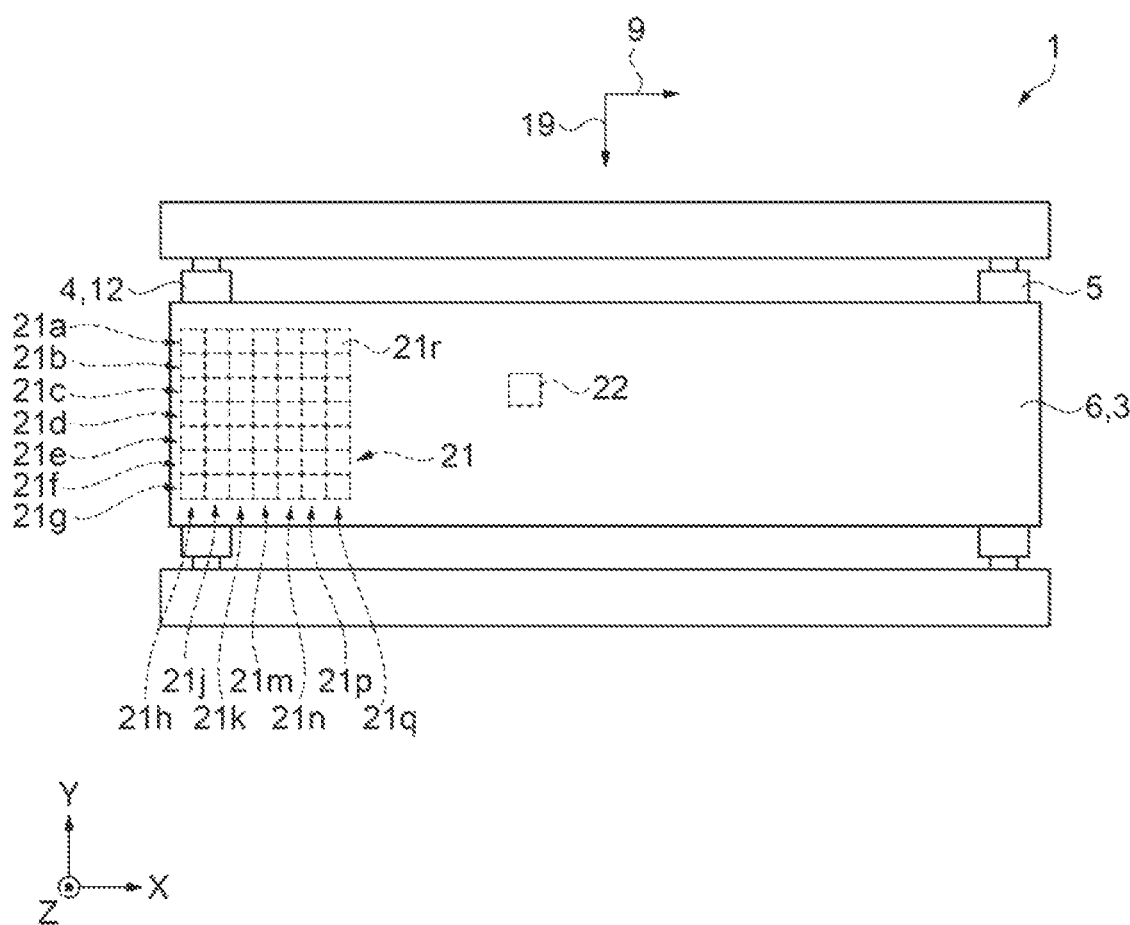
FIG. 2 is a schematic plan view showing a configuration of a belt conveyor.

In FIG. 2, the robot 15 is omitted. As shown in FIG. 2, a direction orthogonal to the first direction 9 on an XY-plane is referred to as "second direction 19". The second direction 19 is the Y negative direction. In FIG. 2, a first imaging area 21 as an imaging area as a range imaged by the first camera 13 is shown by dotted lines. A second imaging area 22 as a range imaged by the second camera 18 is shown by dotted lines. The first imaging area 21 and the second imaging area 22 have rectangular shapes. The position of the first imaging area 21 is fixed.

The first imaging area 21 is divided into 49 sections 21r in seven rows and seven columns. From the side in the Y positive direction toward the side in the Y negative direction, a first row 21a, a second row 21b, a third row 21c, a fourth row 21d, a fifth row 21e, a sixth row 21f, and a seventh row 21g are assigned. From the side in the X negative direction toward the side in the X positive direction, a first column 21h, a second column 21j, a third column 21k, a fourth column 21m, a fifth column 21n, a sixth column 21p, and a seventh column 21q are assigned.

The section 21r in the corner at the side in the X negative direction and the side in the Y positive direction is in the first row 21a and the first column 21h. The section 21r in the corner at the side in the X positive direction and the side in the Y negative direction is in the seventh row 21g and the seventh column 21q.

The second imaging area 22 is the smaller range and has higher resolution than the first imaging area 21. The second camera 18 and the second imaging area 22 are moved by the robot 15.

Figure 3:
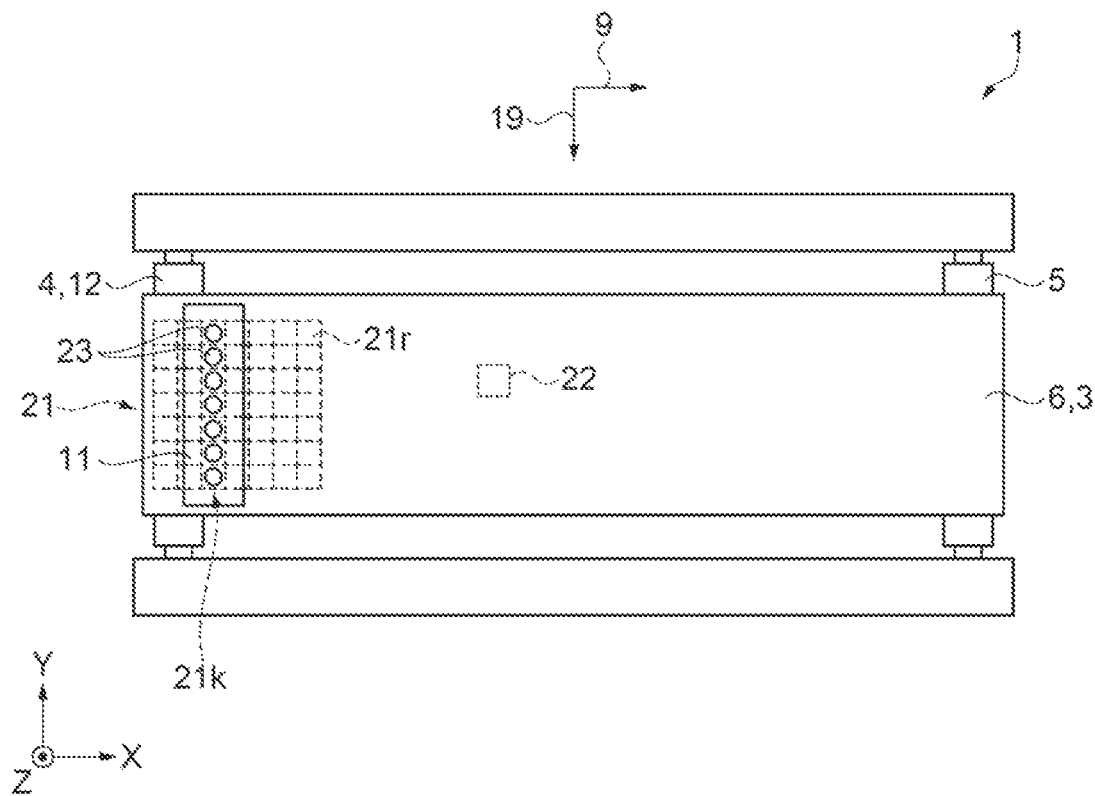
FIG. 3 is a schematic plan view showing the configuration of the belt conveyor.

As shown in FIG. 3, markers 23 are formed on the plate 11. The markers 23 have circular shapes and centers of gravity easily calculated.

The first camera 13 images the markers 23 on the belt 6. When a workpiece is present on the belt 6, the first camera 13 images the workpiece on the belt 6.

The belt 6 of the belt conveyor 3 transports the markers 23. The first camera 13 images the markers 23. The control apparatus 15b detects the marker 23 passing through one section 21r of the plurality of sections 21r formed by division of the first imaging area 21 as the imaging area of the first camera 13 from the captured image of the first camera 13.

Figure 4:
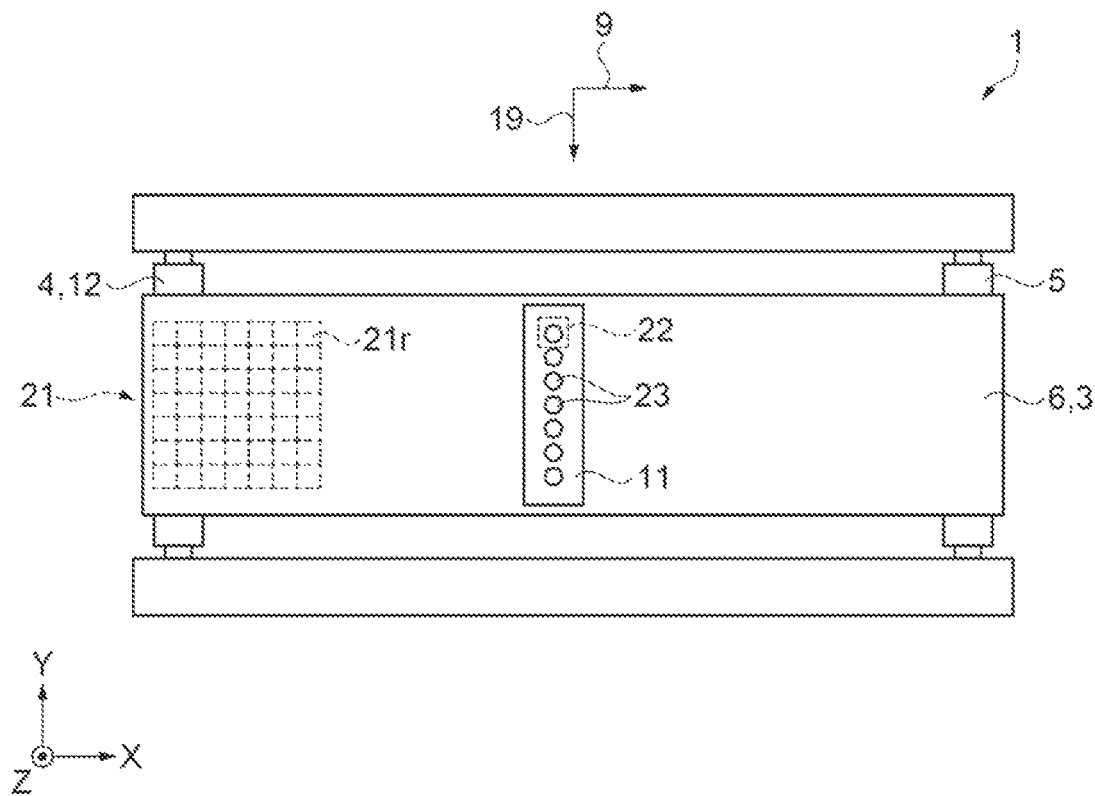
FIG. 4 is a schematic plan view showing the configuration of the belt conveyor.

As shown in FIG. 4, the belt 6 of the belt conveyor 3 transports the markers 23 in the first direction 9. The robot 15 moves the second camera 18, and thereby, the second camera 18 tracks and images the detected marker 23. The robot 15 moves the second camera 18 so that the position of the marker 23 estimated from the transportation amount of the belt 6 may be located at the center of the second imaging area 22.

The control apparatus 15b calculates and stores a correction value as a difference between the position of the marker 23 estimated from the transportation amount of the belt 6 and a position of the marker 23 detected from an image of the marker 23 tracked and imaged.

Figure 5:
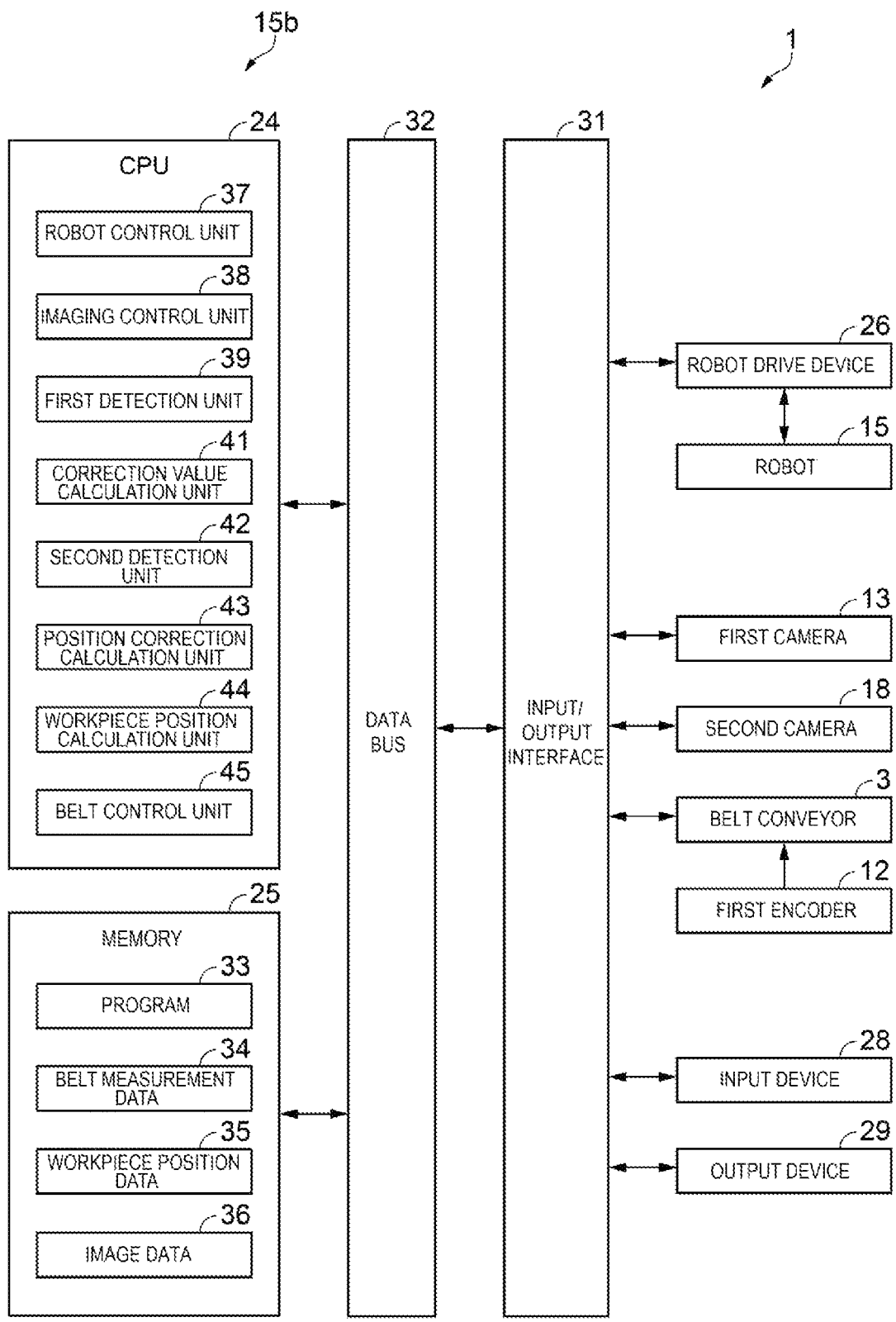
FIG. 5 is an electric block diagram of the robot system.

As shown in FIG. 5, the control apparatus 15b includes a CPU 24 (central processing unit) as a computer that performs various kinds of operation processing and a memory 25 as a memory unit that stores various kinds of information. A robot drive device 26, the first camera 13, the second camera 18, the belt conveyor 3, an input device 28, and an output device 29 are coupled to the CPU 24 via an input/output interface 31 and a data bus 32.

The robot drive device 26 is a device that drives the robot main body 15a. The robot drive device 26 drives the second motors 15d, the second encoders 15e, and the elevation device 15f of the robot main body 15a and the actuator 17.

Data of the images captured by the first camera 13 and the second camera 18 is transmitted to the CPU 24 via the input/output interface 31 and the data bus 32.

The output of the first encoder 12 of the belt conveyor 3 is transmitted to the CPU 24 via the input/output interface 31 and the data bus 32.

The input device 28 is a keyboard, a joy stick, or the like. A worker inputs various instructions by operating the input device 28.

The output device 29 is a display device, an external output device, or the like. The worker views the display device and checks various kinds of information. The output device 29 includes an external interface that communicates with an external device.

The memory 25 includes a semiconductor memory such as a RAM (Random Access Memory) or a ROM (Read Only Memory). The memory 25 stores a program 33 in which a procedure of motion of the robot main body 15a is described. Further, the memory 25 stores belt measurement data 34. The belt measurement data 34 is data representing meandering and a position shift of the belt 6. Furthermore, the memory 25 stores workpiece position data 35. The workpiece position data 35 is data representing the position of the workpiece on the belt 6. In addition, the memory 25 stores image data 36. The image data 36 is data of the images captured by the first camera 13 and the second camera 18. The memory 25 includes a memory area that functions as a work area for operation of the CPU 24, a temporary file, or the like and other various memory areas.

The CPU 24 drives the robot system 1 according to the program 33 stored within the memory 25. The CPU 24 operated by the program 33 has a robot control section 37 as an operation control unit as a specific function realization unit. In the control apparatus 15b, the robot control section 37 controls the motion of the robot main body 15a. When the robot 15 performs work on a workpiece on the belt 6, the first camera 13 is controlled to image the workpiece.

Further, the CPU 24 has an imaging control section 38. The imaging control section 38 controls times of imaging by the first camera 13 and the second camera 18.

A first detection unit 39 as a first detection unit detects the marker 23 passing through one section 21r of the plurality of sections 21r formed by division of the first imaging area 21 of the first camera 13.

A correction value calculation unit 41 as a correction value calculation unit calculates and stores a correction value as a difference between the position of the marker 23 estimated from the transportation amount of the belt 6 and the position of the marker 23 detected from the image of the marker 23 tracked and imaged as a part of the belt measurement data 34 in the memory 25.

Specifically, when the second camera 18 images the marker 23, the imaging control section 38 detects a shift amount between the center of the image captured by the second camera 18 and the center of the marker 23. The shift amount contains a distance shifted in the first direction 9 and a distance shifted in the second direction 19.

A second detection unit 42 as a second detection unit inputs an image containing the workpiece imaged by the first camera 13 and detects the section 21r through which the workpiece passes of the plurality of sections 21r when the robot 15 performs work on the workpiece on the belt 6.

Further, the CPU 24 has a position correction calculation unit 43 as a correction unit. The position correction calculation unit 43 calculates the position of the workpiece changed due to a shift or meandering of the belt 6. The position correction calculation unit 43 acquires the correction value corresponding to the workpiece passing through the section 21r detected in the first imaging area 21 from the memory 25 and the position correction calculation unit 43 corrects position information of the workpiece using the correction value.

The robot control section 37 controls the robot 15 to perform work on the workpiece using the corrected position information of the workpiece.

Further, the CPU 24 has a workpiece position calculation unit 44. The workpiece position calculation unit 44 calculates the position of the workpiece when the belt 6 does not meander from the output of the first encoder 12.

Furthermore, the CPU 24 has a belt control section 45. The belt control section 45 controls a movement speed of the belt 6. The belt control section 45 inputs the output of the first encoder 12 and recognizes the movement speed and the movement amount of the belt 6.

Next, a procedure of a belt conveyor calibration method of the robot system 1 will be explained.

Figure 6:
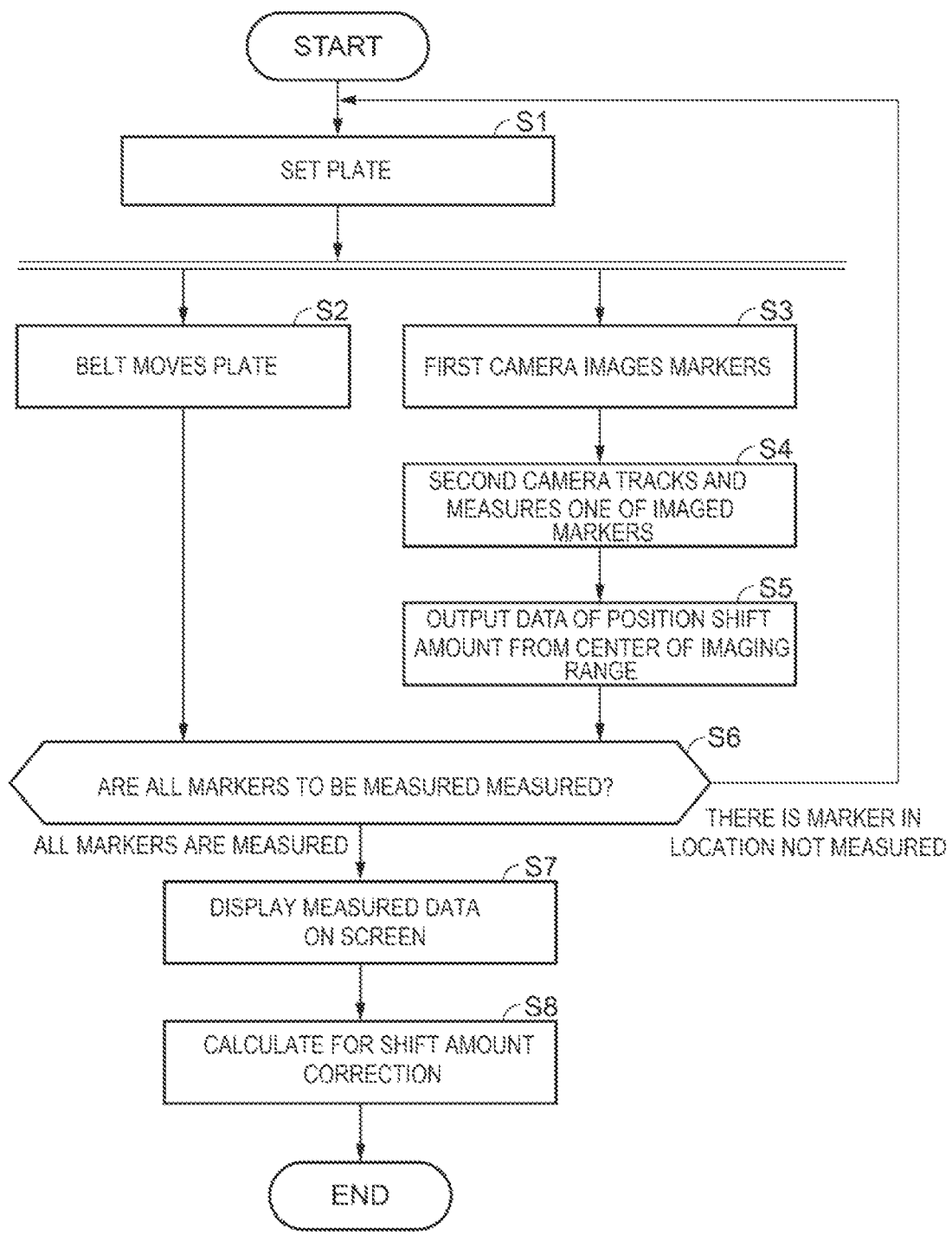
FIG. 6 is a flowchart of a calibration method.

FIG. 6 shows a work procedure for performing a calibration of the belt conveyor 3 of the robot system 1. In FIG. 6, at step S1, the worker places the plate 11 on the belt 6. First, the plate 11 is placed so that the plate may be imaged in the first column 21h. Then, the procedure goes to step S2 and step S3. Step S2 and step S3 are performed in parallel.

At step S2, the belt 6 moves the plate 11. The belt 6 of the belt conveyor 3 transports the marker 23. When the belt 6 meanders, the markers 23 also meander. Then, the procedure goes to step S6.

At step S3, the first camera 13 images the markers 23. The first detection unit 39 detects the marker 23 passing through one section 21r of the plurality of sections 21r formed by division of the first imaging area 21 of the first camera 13 from the captured image of the first camera 13. The first detection unit 39 first detects the marker 23 passing through the section 21r in the first column 21h and the first row 21a.

At step S4, the second camera 18 tracks and measures one of the imaged markers 23. The second camera 18 tracks the marker 23 passing through the section 21r in the first column 21h and the first row 21a detected at step S3. The image of the marker 23 is stored as a part of the belt measurement data 34 in the memory 25. In other words, the second camera 18 is moved by the robot 15, and thereby, the second camera 18 tracks the detected marker 23 and images the marker 23. Then, the procedure goes to step S5.

At step S5, the correction value calculation unit 41 calculates data of a position shift from the center of the second imaging area 22 as the imaging range. The position shift data is stored as a part of the belt measurement data 34 in the memory 25. Then, the procedure goes to step S6.

At step S6, whether or not all of the markers 23 to be measured are measured is determined. When there is a marker 23 in a location not measured, then, the procedure goes to step S1.

In the first column 21h, the markers 23 are sequentially measured from the first row 21a to the seventh row 21g. When all of the measurements of the markers 23 in the first column 21h end, then, at step S1, the plate 11 is placed so that the markers 23 on the plate 11 may be imaged in the second column 21j. Further, the plate 11 is placed in the third column 21k to the seventh column 21q so that the markers 23 on the plate 11 may be sequentially imaged.

At step S3, in one column, the row is sequentially changed. When the measurements of the markers 23 in the first row 21a end, then, the markers 23 in the second row 21b are imaged. Further, the markers 23 are imaged from the third row 21c to the seventh row 21g. At step S4, the markers 23 imaged at step S3 are tracked. When a determination that the measurements of the markers 23 passing through all of the sections 21r are finished is made at step S6, the procedure goes to step S7.

At step S7, the measured data is displayed on a screen of the output device 29. Then, the procedure goes to step S8. At step S8, a calculation for shift amount correction is performed. An approximate expression for shift amount correction of the belt 6 is calculated from the trajectory of the marker 23 tracked and measured by the second camera 18 and stored as a part of the belt measurement data 34 in the memory 25.

In other words, the correction value calculation unit 41 calculates and stores the correction value as a difference between the position of the marker 23 estimated from the transportation amount of the belt 6 and the position of the marker 23 detected from the image of the marker 23 tracked and imaged.

The second camera 18 tracks and images the markers 23 passing through the respective sections 21r of all sections 21r of the plurality of sections 21r, and the correction value calculation unit 41 calculates the correction value.

According to the method, trajectories in which the markers 23 passing through the respective sections 21r in the plurality of sections 21r move are detected. Then, the correction value is calculated. Therefore, a trajectory of the workpiece passing through some of the plurality of sections 21r may be accurately estimated.

According to the method, the number of the plurality of sections 21r may be changed by the worker. The larger the number of sections 21r, the smaller the respective sections 21r, and the position accuracy may be accurately detected. However, the number of measurements is larger, and the man-hour for the measurements increases. The worker sets the smaller number of sections 21r of the numbers of sections 21r that satisfy the necessary position accuracy, and thereby, may calibrate the belt conveyor 3 with higher productivity.

Figure 7:
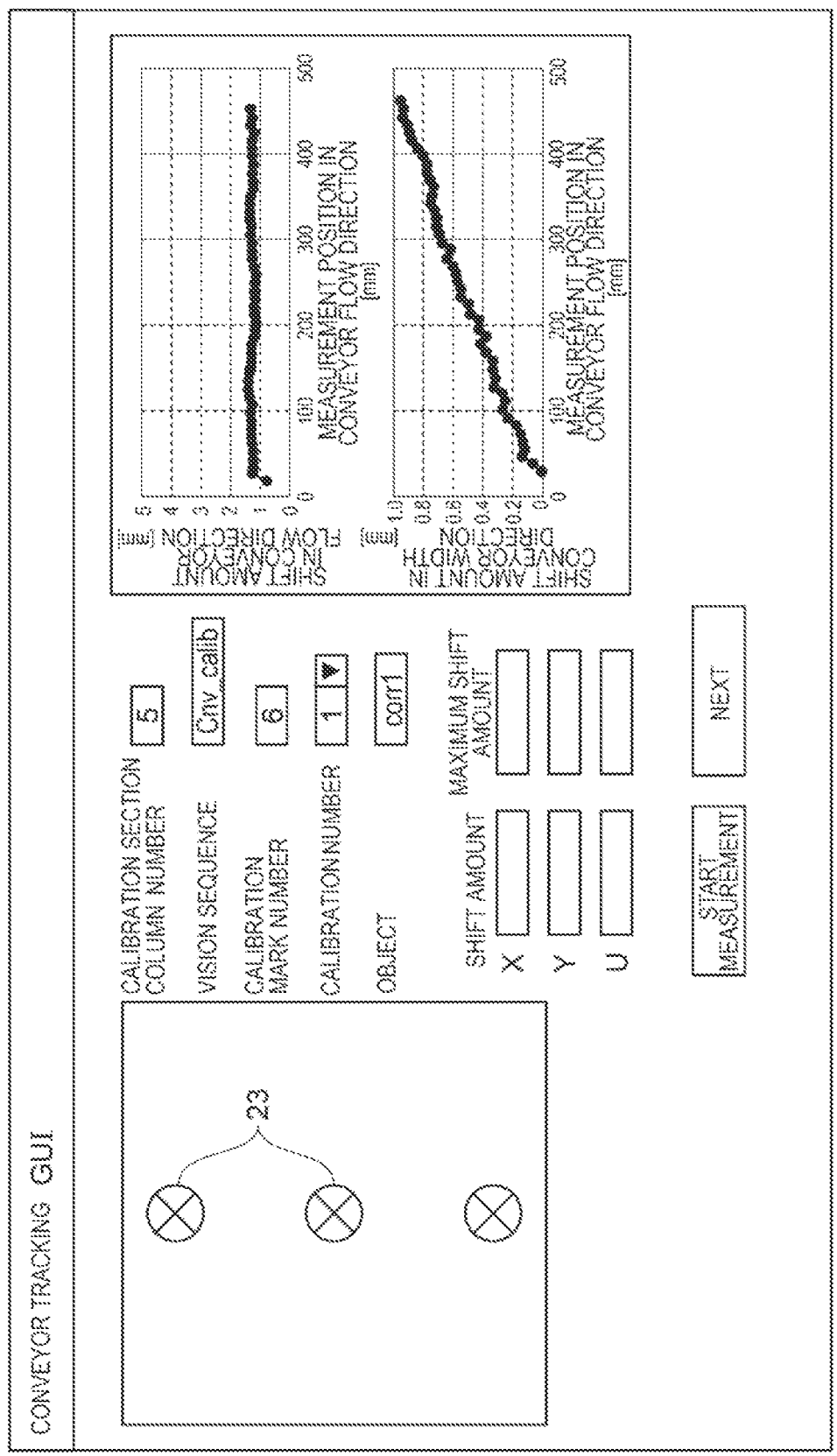
FIG. 7 shows a display example of a calibration result.

FIG. 7 shows an example of a screen displayed at step S7. Within the left frame, an image of the markers 23 imaged by the first camera 13 is shown. Within the right frame, two graphs are shown. In the upper part of the right frame, the shift amount of the belt 6 in the first direction 9 is shown. The horizontal axis of the graph indicates the position of the marker 23 in the first direction 9. The vertical axis indicates the shift amount of the belt 6 in the first direction 9. In the lower part of the right frame, the shift amount of the belt 6 in the second direction 19 is shown. The horizontal axis of the graph indicates the position of the marker 23 in the first direction 9. The vertical axis indicates the shift amount of the belt 6 in the second row 21b. The graph is an example in which the belt 6 meanders.

At the center, measurement conditions are shown. The calibration section column number shows data representing the column of the first column 21h to seventh column 21q through which the marker 23 passes. The numeral "5" shows the fifth column 21n.

The vision sequence is an identifier of the program 33 for the robot 15 to move the second camera 18. The calibration mark number shows data representing the row of the first row 21a to seventh row 21g through which the marker 23 passes. The numeral "6" shows the sixth row 21f.

The calibration number shows an identification number of the section 21r. The object shows an identifier of a captured image. The shift amount shows a shift amount in a particular location. The maximum shift amount shows the maximum shift amount in a path in which the second camera 18 tracks.

Figure 8:
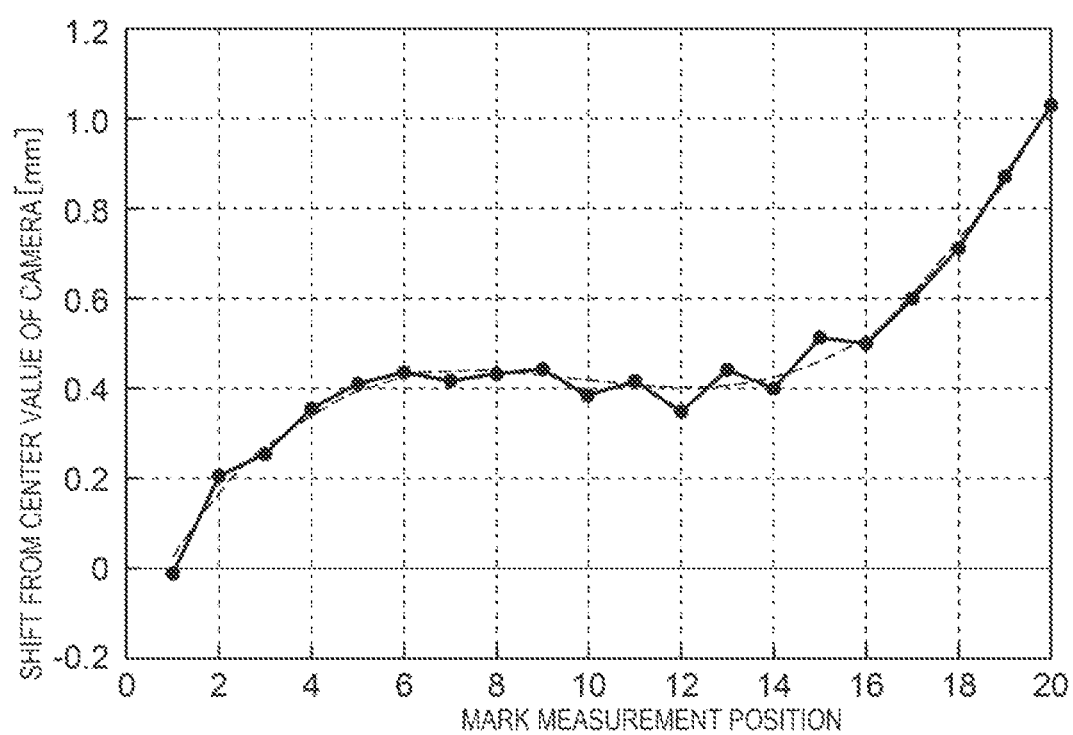
FIG. 8 shows an example of approximation of a shift amount using an approximate expression.

FIG. 8 shows an example of a graph of a result of the calculation for the shift amount correction at step S8. The horizontal axis indicates the position of the belt 6 in the first direction 9. The vertical axis shows the shift amount in the second direction 19. Specifically, the shift amount of the center of gravity of the marker 23 with respect to the center of the second imaging area 22 is shown. A solid line forms a line graph passing through plots of measurement values. A dotted line shows an approximate expression calculated by the least-squares method using the plots of the measurement values. The approximate expression is a cubic equation. The approximate expression is calculated with respect to all of the 49 sections 21r of the first imaging area 21.

A row number in the section 21r of the first imaging area 21 is referred to as "CamX" and a column number is referred to as "CamY". The position of the second imaging area 22 in the first direction 9 is referred to as "CnvX". With the approximate expression of the shift amount in the first direction 9 as a function FX, the correction value of the shift amount in the first direction 9 is shown by FX(CamX, CamY, CnvX). With the approximate expression of the shift amount in the second direction 19 as a function FY, the correction value of the shift amount in the second direction 19 is shown by FY(CamX, CamY, CnvX).

FX(CamX, CamY, CnvX) and FY(CamX, CamY, CnvX) are stored as a part of the belt measurement data 34 in the memory 25. This is the end of the procedure of the belt conveyor calibration method.

Next, a procedure of a robot control method performed subsequent to the belt conveyor calibration method will be explained. The procedure of the robot control method is a procedure when the robot 15 performs work on a workpiece on the belt 6. The correction value is already calculated and stored in the memory 25 using the above described belt conveyor calibration method.

Figure 9:
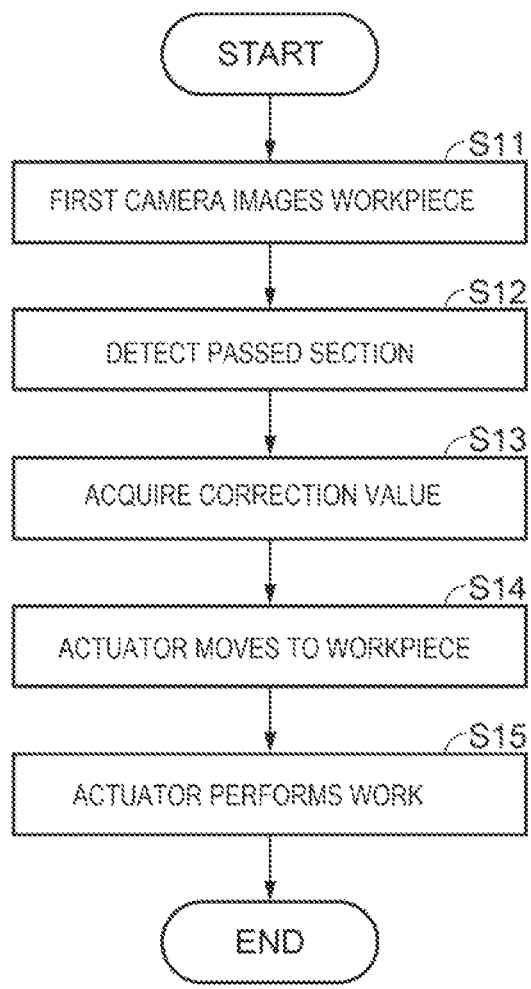
FIG. 9 is a flowchart of a control method for a robot.

FIG. 9 shows a work procedure for the robot 15 of the robot system 1 to perform work on a workpiece transported by the belt 6.

In FIG. 9, at step S11, the first camera 13 images a workpiece. Then, the procedure goes to step S12. At step S12, the second detection unit 42 detects the section 21r through which the workpiece passes of the plurality of sections 21r. Then, the procedure goes to step S13. At step S13, the position correction calculation unit 43 acquires the correction value corresponding to the section 21r through which the workpiece passes from the memory 25. The workpiece position calculation unit 44 calculates the position of the workpiece when the belt 6 does not meander from the output of the first encoder 12. The position correction calculation unit 43 corrects coordinates at which the workpiece is located using the correction value.

The row number of the section 21r through which the workpiece passes is referred to as "CamX", the column number is referred to as "CamY". The position of the workpiece in the first direction 9 obtained from the first encoder 12 is referred to as "CnvX". The position of the workpiece before correction in the first direction 9 is referred to as "RbXb", and the position of the workpiece after correction is referred to as "RbXa". RbXa=RbXb+FX (CamX, CamY, CnvX). The position of the workpiece before correction in the second direction 19 is referred to as "RbYb", and the position of the workpiece after correction is referred to as "RbYa". RbYa=RbYb+FY(CamX, CamY, CnvX). Then, the procedure goes to step S14.

At step S14, the actuator 17 moves to the workpiece. The robot control section 37 moves the actuator 17 to the coordinates (RbXa, RbYa) after correction. Then, the procedure goes to step S15.

At step S15, the actuator 17 performs work. For example, the actuator 17 picks up the workpiece. As described above, the robot 15 corrects the position information of the workpiece using the correction value and performs work on the workpiece using the corrected position information of the workpiece.

Figure 10:
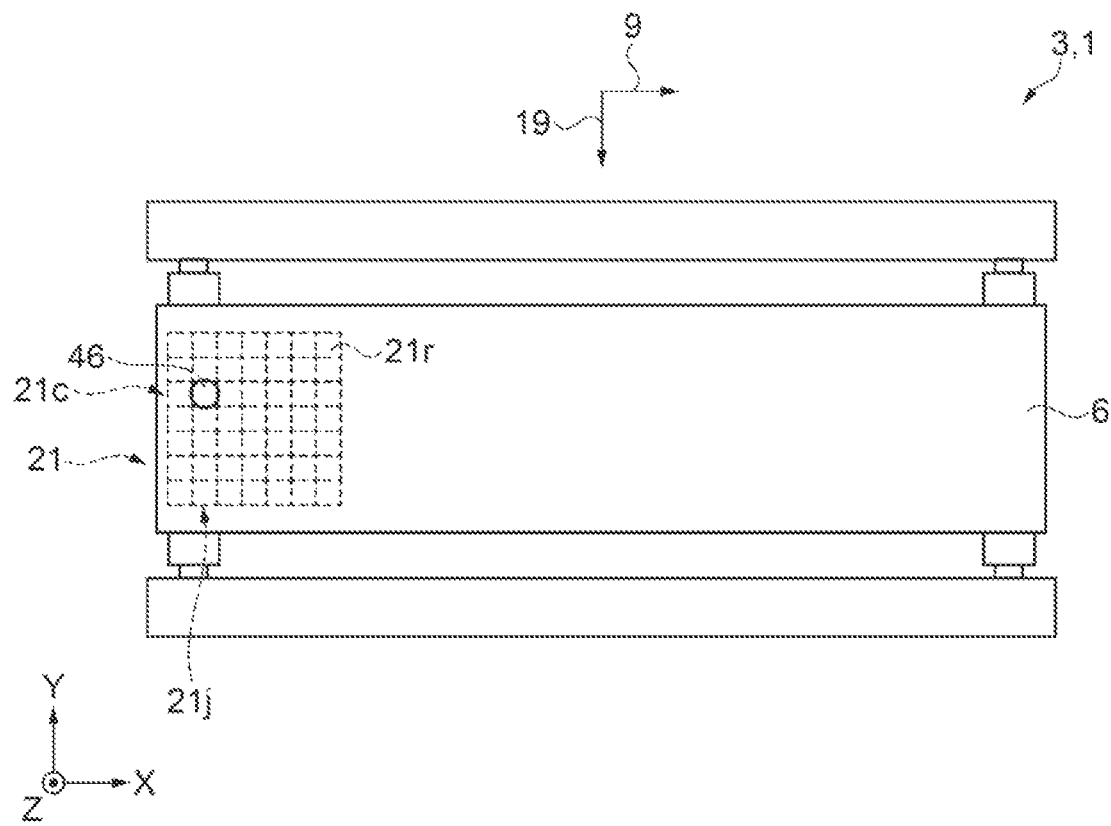
FIG. 10 is a schematic plan view for explanation of the control method for the robot.

FIG. 10 corresponds to step S12. As shown in FIG. 10, the second detection unit 42 detects the section 21r through which a workpiece 46 as an object passes. For example, the workpiece 46 passes through the section 21r in the third row 21c and the second column 21j.

Figure 11:
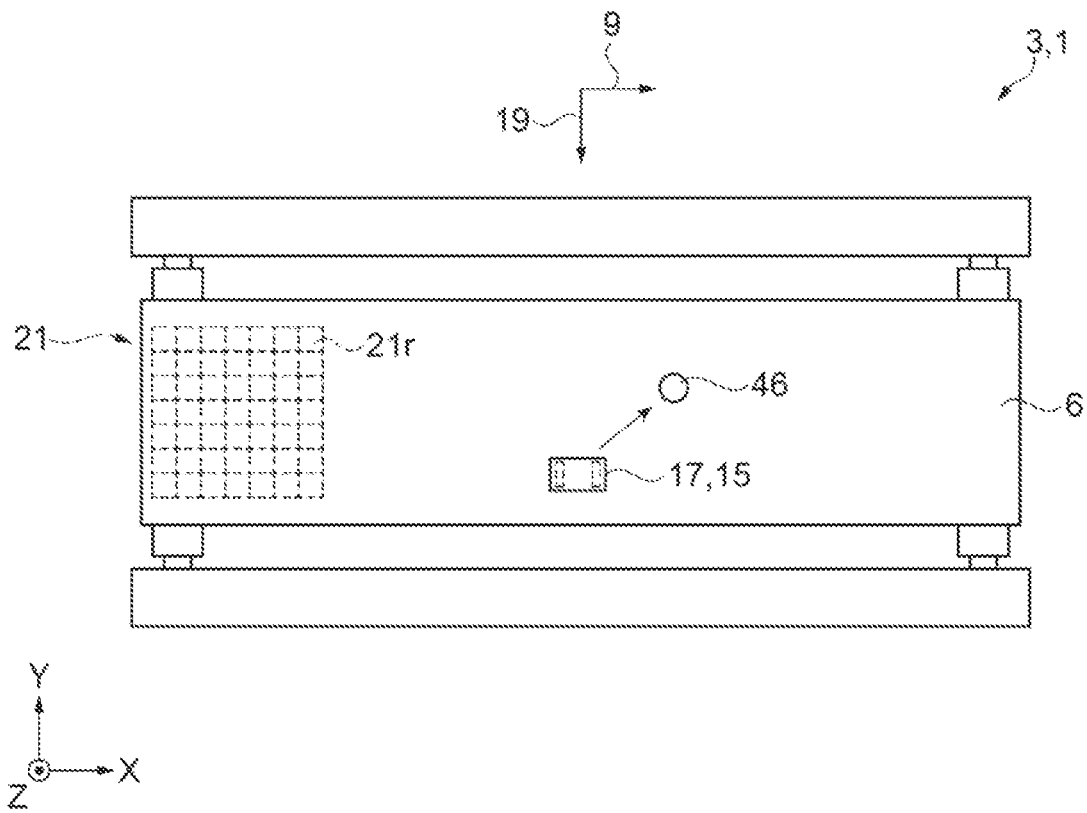
FIG. 11 is a schematic plan view for explanation of the control method for the robot.

FIG. 11 corresponds to step S14. As shown in FIG. 11, the workpiece 46 is transported by the belt 6 and moves in the first direction 9. The actuator 17 moves toward the workpiece 46.

The shift amount of the belt 6 is corrected in the position of the workpiece 46 as a goal of the movement of the actuator 17, and thereby, the actuator 17 may reach the workpiece 46 with higher position accuracy.

According to the belt conveyor calibration method, the configuration of the robot system 1, and the program 33, the marker 23 transported by the belt 6 and passing through the predetermined section 21r is detected. Then, the second camera 18 tracks the marker 23. Therefore, the trajectory in which the marker 23 passing through the predetermined section 21r moves is measured. The belt 6 includes the first encoder 12 and the position of the marker 23 is estimated from the movement amount of the belt 6. The estimated movement of the marker 23 advances along a straight line. On the other hand, the measured trajectory of the marker 23 includes influences by meandering of the belt 6 etc. A difference between the measured trajectory of the marker 23 and the estimated trajectory of the movement is stored as the correction value.

When the workpiece 46 passing through the predetermined section 21r is transported by the belt 6 instead of the marker 23, the robot 15 may accurately estimate the trajectory in which the workpiece 46 moves using the correction value. That is, the position of the workpiece 46 including the influence by the meandering of the belt 6 may be accurately known.

As the method of measuring the trajectory of the movement of the marker 23, there is a method using the actuator 17 of the robot 15. The belt 6 is intermittently actuated, the actuator 17 of the robot 15 contacts the marker 23, and the robot 15 measures the position of the marker 23. That is, the robot 15 measures the trajectory of the marker 23 using the robot 15 as a three-dimensional measuring instrument. Compared to the method, the method using the first camera 13 and the second camera 18 may measure the position of the marker 23 while continuously driving the belt 6 and calculate the correction value with higher productivity. Therefore, the method of efficiently measuring the meandering due to sagging of the belt 6 or the like may be provided.

According to the robot control method, the position of the workpiece 46 is corrected using the correction value, and thereby, the robot 15 accurately estimates the position of the workpiece 46. Therefore, the robot 15 performs work on the workpiece 46 recognized with higher position accuracy, and may perform scheduled work with higher quality.

Second Embodiment

In the above described first embodiment, the approximate expression for correction is calculated from the row and the column of the section 21r passing through the first imaging area 21 and the position in the second direction 19. The position in the first direction 9 may be divided into a plurality of sections and correction values in the respective sections may be calculated.

Figure 12:
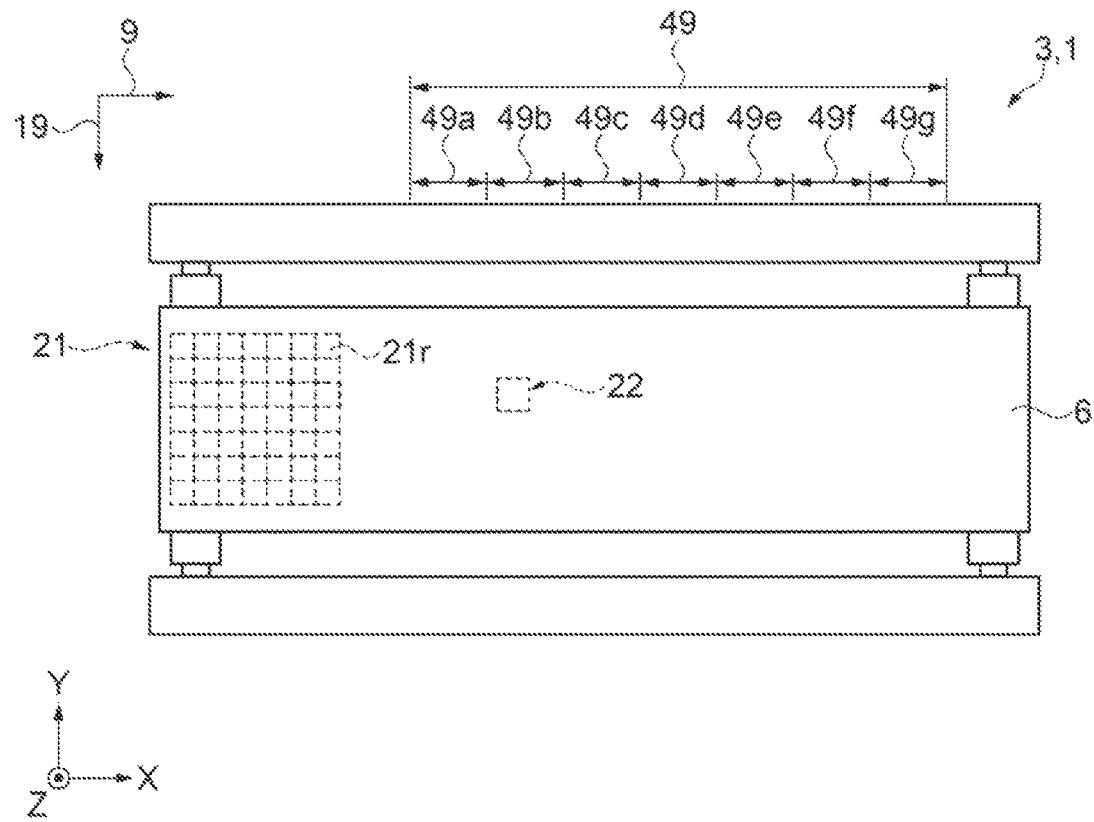
FIG. 12 is a schematic plan view showing a configuration of a belt conveyor according to a second embodiment.

As shown in FIG. 12, motion ranges 49 in which the robot 15 may move the actuator 17 in the first direction 9 are divided into seven sections. The respective motion ranges 49 include first section 49a to seventh section 49g. At step S5, the correction value calculation unit 41 calculates data of averages of the position shifts from the center of the second imaging area 22 as the imaging range in the respective sections. The data of averages of the position shifts is stored as a part of the belt measurement data 34 in the memory 25.

In the belt measurement data 34 in the memory 25, a table of the data of the averages of the first section 49a to seventh section 49g in the respective sections 21r of the first imaging area 21 is stored. The data of the averages in the table is the correction value. In the table of the data of the averages, the correction values in the markers 23 passing through the respective 49 sections 21r of the first imaging area 21 are set. The sections of the first section 49a to seventh section 49g are referred to as "CnvL". Parameters of the correction value of the shift amount in the first direction 9 are CamX, CamY, CnvL. Parameters of the correction value of the shift amount in the second direction 19 are also CamX, CamY, CnvL.

Figure 13:
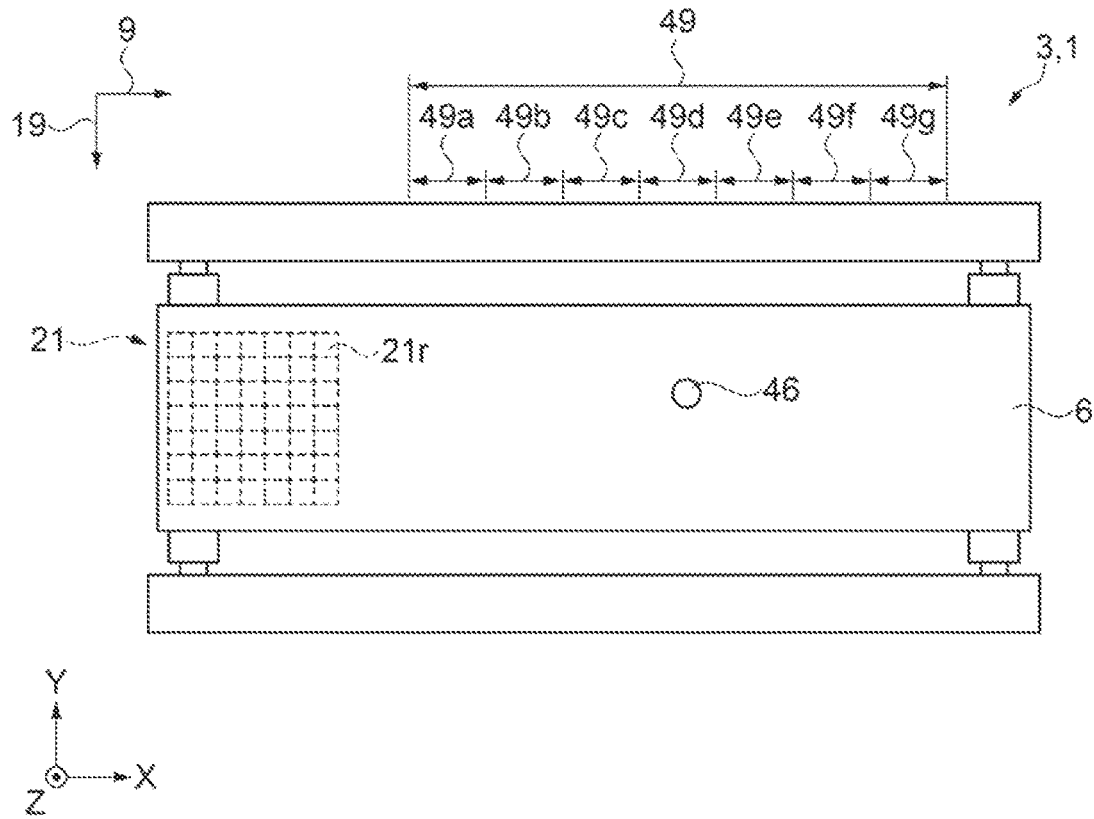
FIG. 13 is a schematic plan view showing the configuration of the belt conveyor.

As shown in FIG. 13, the workpiece 46 is transported by the belt 6. At step S12, the second detection unit 42 detects the section 21r through which the workpiece 46 passes of the sections 21r of the first imaging area 21. At step S13, the position correction calculation unit 43 acquires the correction value corresponding to the section 21r of the first imaging area 21 through which the workpiece 46 passes from the memory 25. The table of data of the correction values is stored in the memory 25.

The workpiece position calculation unit 44 calculates the position of the workpiece 46 when the belt 6 does not meander from the output of the first encoder 12. The position correction calculation unit 43 corrects coordinates at which the workpiece 46 is located using the correction value corresponding to CnvL. For example, when the workpiece 46 is located within the section of the fourth section 49d, the position correction calculation unit 43 refers to the correction value in the fourth section 49d from the table. At step S14, the actuator 17 moves to the workpiece 46. At step S15, the actuator 17 performs work. Therefore, the correction values are stored in the table, and thereby, the belt conveyor calibration method for efficiently measuring meandering due to sagging of the belt 6 or the like and the robot control method for the robot 15 to perform work using the correction values may be provided.

What is claimed is:

1. A belt conveyor calibration method comprising:
   transporting a marker plate by a belt of a belt conveyor along a first direction, the belt conveyor rotating by a pulley driven by a motor, a rotary encoder being disposed in the pulley, a plurality of markers being arranged as a single line on the marker plate along a second direction perpendicular to the first direction;
   imaging the plurality of markers by a first camera;
   detecting one of the plurality of markers passing through one section of a plurality of sections formed by division of an imaging area of the first camera from a captured image of the first camera, the plurality of sections being in a matrix having a plurality of rows and a plurality of columns;
   moving a second camera by a robot and tracking and imaging the detected one of the plurality of markers by the second camera;
   estimating a position of the detected one of the plurality of markers based on a rotation angle of the pulley, the rotation angle being detected by the rotary encoder;
   calculating and storing a correction value as a difference between the estimated position of the detected one of the plurality of markers and a position of the one of the plurality of markers detected from an image of the detected one of the plurality of markers tracked and imaged by the second camera;
   repeating the transportation of the marker plate, the imaging the plurality of markers, the detecting, the moving of the second camera, the estimating, and the calculating and storing for every marker of the plurality of markers with respect to every intersection point of the plurality of rows and the plurality of columns corresponding to the plurality of sections; and
   calibrating the belt conveyor based on the calculated and stored correction values after the repeating.

2. The belt conveyor calibration method according to claim 1, wherein
   a number of the plurality of sections is configured to be changed by a worker.

3. A robot control method comprising:
   calculating and storing the correction values in a memory using the belt conveyor calibration method according to claim 1;
   when the robot performs work on an object on the belt, imaging the object by the first camera;
   detecting a section of the plurality of sections through which the object passes;
   acquiring the correction value corresponding to the section through which the object passes from the memory; and
   correcting position information of the object using the correction value and performing the work on the object using the corrected position information of the object by the robot.

4. A robot system comprising:
   a belt conveyor having a belt on which a marker plate and an object are transported along a first direction, a pulley driven by a motor, and a rotary encoder being disposed in the pulley, a plurality of markers being arranged as a single line on the marker plate along a second direction perpendicular to the first direction;
   a robot having a motion range containing the belt;
   a first camera imaging the plurality of markers on the marker plate and the object on the belt;
   a second camera attached to an arm or a hand of the robot and tracking and imaging one of the plurality of markers on the belt;
   a memory configured to store a program; and
   a processor configured to execute the program so as to control motion of the robot, wherein
   the processor is further configured to:
     cause the belt conveyor to transport the plurality of markers on the marker plate by the belt;
     cause the first camera to image the plurality of markers;
     detect one of the plurality of markers passing through one section of a plurality of sections formed by division of an imaging area of the first camera from a captured image of the first camera, the plurality of sections being in a matrix having a plurality of rows and a plurality of columns;
     cause the second camera to move and perform tracking and imaging the detected one of the plurality of markers;
     estimate a position of the detected one of the plurality of markers based on a rotation angle of the pulley, the rotation angle being detected by the rotary encoder;
     calculate a correction value as a difference between the estimated position of the detected one of the plurality of markers and a position of the one of the plurality of markers detected from an image of the detected one of the plurality of markers tracked and imaged by the second camera;
     store the correction value in the memory;
     repeat the transportation of the marker plate, the imaging the plurality of markers, the detecting, the moving of the second camera, estimating, and the calculating and storing for every marker of the plurality of markers with respect to every intersection point of the plurality of rows and the plurality of columns corresponding to the plurality of sections; and
     calibrate the belt conveyor based on the calculated and stored correction values after the repeating,
   when the robot performs work on the object on the belt, the processor is further configured to:
     cause the first camera to image the object;
     detect a section of the plurality of sections through which the object passes;
     acquire the correction value corresponding to the object passing through the section containing the object from the memory; and
     correct position information of the object using the correction value and control the robot to perform the work on the object using the corrected position information of the object.

* * * * *